US007530603B2

(12) United States Patent
Fernandes et al.

(10) Patent No.: US 7,530,603 B2
(45) Date of Patent: May 12, 2009

(54) PIPE PENETRATION SYSTEM

(75) Inventors: Carlos Serafim Albuquerque Fernandes, Greenville, SC (US); Nicholas Philip Poccia, Gansevoort, NY (US); Leroy Omar Tomlinson, San Diego, NY (US); Laurence Ambrose Kenny, III, Rindge, NH (US)

(73) Assignee: General Electric Company, Schenectady, NY (US)

( * ) Notice: Subject to any disclaimer, the term of this patent is extended or adjusted under 35 U.S.C. 154(b) by 370 days.

(21) Appl. No.: 11/424,608

(22) Filed: Jun. 16, 2006

(65) Prior Publication Data
US 2007/0290502 A1 Dec. 20, 2007

(51) Int. Cl.
*F16L 41/08* (2006.01)
*F16L 41/12* (2006.01)
*F16L 51/02* (2006.01)

(52) U.S. Cl. .................. 285/192; 285/226; 285/236
(58) Field of Classification Search ............. 285/145.5, 285/189, 192, 196, 201, 216, 226, 235, 236, 285/49, 53; 454/44–47, 306, 903; 110/184
See application file for complete search history.

(56) References Cited

U.S. PATENT DOCUMENTS

| 1,968,051 | A | * | 7/1934 | Montford | 378/202 |
| 2,540,898 | A | * | 2/1951 | Macardier | 174/22 R |
| 2,779,609 | A | * | 1/1957 | Portney et al. | 285/45 |
| 2,841,419 | A | * | 7/1958 | Jay | 285/225 |
| 3,001,801 | A | * | 9/1961 | Downing | 285/13 |
| 3,355,190 | A | * | 11/1967 | Francis | 285/50 |
| 3,488,067 | A | * | 1/1970 | Sommer | 285/41 |
| 3,766,357 | A | * | 10/1973 | Koester, Jr. | 392/478 |
| 3,871,689 | A | * | 3/1975 | Zaderei et al. | 285/189 |
| 4,330,135 | A | * | 5/1982 | Butterfield | 277/504 |
| 6,679,655 | B2 | * | 1/2004 | Bonn | 405/184.4 |

FOREIGN PATENT DOCUMENTS

JP 06094294 A * 4/1994

* cited by examiner

*Primary Examiner*—James M Hewitt
(74) *Attorney, Agent, or Firm*—Sutherland Asbill & Brennan, LLP

(57) ABSTRACT

A penetration system for a pipe entering a duct wall at a pipe stub. The penetration system may include a thermal sleeve surrounding the pipe stub and a bellows positioned below the thermal sleeve and about the pipe.

19 Claims, 1 Drawing Sheet

PIPE PENETRATION SYSTEM

TECHNICAL FIELD

The present application relates generally to gas turbines and more particularly relates to a pipe penetration system for connecting a pipe to a turbine duct wall.

BACKGROUND OF THE INVENTION

A major design consideration of a gas turbine is the thermal and mechanical stresses due to the connection between the ductwork and the pipes that penetrate the duct. Specifically, the need to accommodate the insertion of hot pipes through relatively cool inlet and exhaust exterior duct walls. If the piping system does not fully accommodate all relative movements, the pipe penetration point eventually may fail. Gas turbine ducts often are required to be penetrated with pipes to supply steam for cooling, to provide oil for lubrication, or for other many other purposes. The pipe penetration must be designed to contain very high temperature, high velocity, and poisonous exhaust gases. If a leakage point in the duct occurs, the leak could lead to hazardous conditions for plant personnel and for the surrounding turbine equipment. The failure of the duct due to the structural characteristics of the duct materials also is a concern.

The relative movement of the pipe (in three dimensions) may be about two (2) to about four (4) inches (about 5.1 to about 10.2 centimeters) or so as compared to the duct. This design condition generally happens more severely during thermal transients where the pipe quickly expands relative to the duct due to internal heating of the penetrating pipe and insulation protecting the exterior shell. In addition, the pipe is hotter than its connection point to the duct such that the connection also needs to be thermally compliant.

A penetrating pipe is generally welded to a slightly larger pipe stub that protrudes from the duct wall. This type of connection works well as long as there are no appreciable thermal differences between the penetrating pipe and the pipe stub or appreciable movement/growth of the penetrating pipe upstream of the penetration. To address the thermal stress issue, designers generally locate the highest mechanical stress points away from the maximum thermal stress points by encasing the penetrating pipe in a larger cylindrical or conical shroud that is insulated and welded to the ductwork and to the pipe. These designs can accommodate some degree of thermal discrepancies, but add complications to the turbine system as a whole by requiring pipe loops and expansion joints to minimize the relative movement at the pipe penetration.

Thus, there is a desire for a pipe penetration system that can accommodate large axial, vertical, and radial displacements during operation of the gas turbine. The pipe penetration system should contain the internal air or gas flows yet be flexible enough to accommodate thermal and mechanical stresses. Such a system should be economical and should be able to be installed without special machining or tooling so as to result in a simplified piping system.

SUMMARY OF THE INVENTION

The present application thus describes a penetration system for a pipe entering a duct wall at a pipe stub. The penetration system may include a thermal sleeve surrounding the pipe stub and a bellows positioned below the thermal sleeve and about the pipe.

The penetration system further may include a pipe flange attached to the pipe and a pipe stub flange attached to the pipe stub. The bellows may include a first flange for connecting with the pipe flange and a second flange for connecting to the pipe stub flange. The thermal sleeve is positioned about the duct wall. The thermal sleeve may include a truncated conical closeout. The thermal sleeve may include carbon steel or similar types of materials. The bellows may include carbon steel, stainless steel, nickel-chromium-iron alloys, or similar types of materials. The bellows includes a number of folds defined to accommodate the thermal movement of the penetrating pipe. The bellows expands as the pipe deflects. The bellows deflects laterally, vertically, and axially with the thermal growth or deflection of the penetrating pipe.

The present application further describes a penetration system for a pipe entering a duct wall at a pipe stub. The penetration system includes a thermal sleeve surrounding the pipe stub and adjacent to the duct wall and a metal bellows positioned below the thermal sleeve and about the pipe such that the metal bellows expands as the pipe expands.

The penetration system further may include a pipe flange attached to the pipe and a pipe stub flange attached to the pipe stub. The bellows may include a first flange for connecting with the pipe flange and a second flange for connecting to the pipe stub flange. The thermal sleeve may include a truncated conical closeout. The metal bellows deflects laterally, vertically and radially as the pipe deflects.

These and other features of the present application will become apparent to one of ordinary skill in the art upon review of the following detailed description of the embodiments when taken in conjunction with the drawings and the appended claims.

DETAILED DESCRIPTION

Figure 1:
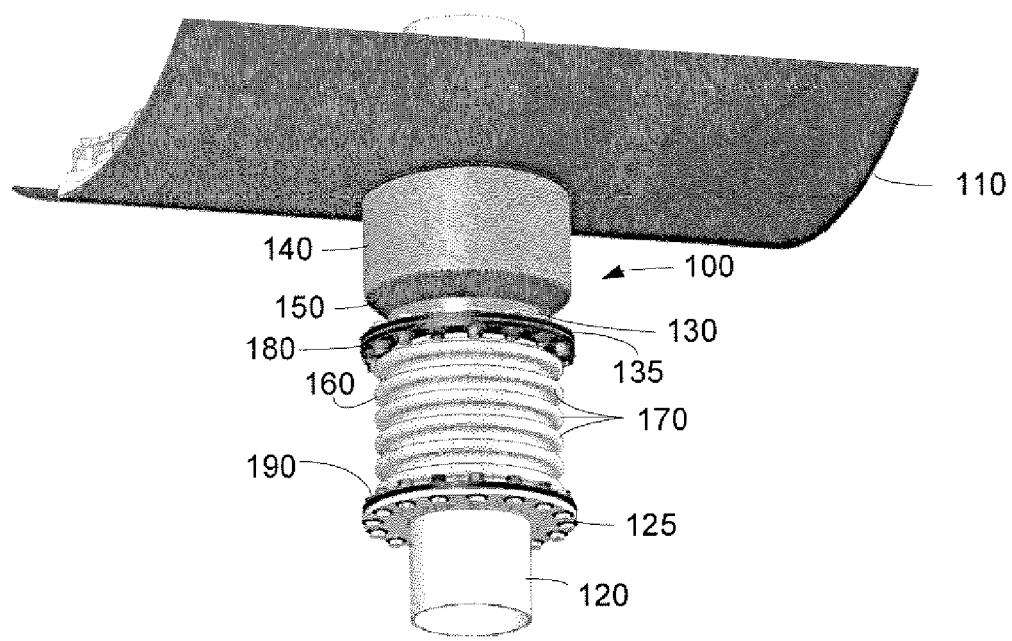
FIG. 1 is a perspective view of a pipe penetration system as is described herein.
Figure 2:
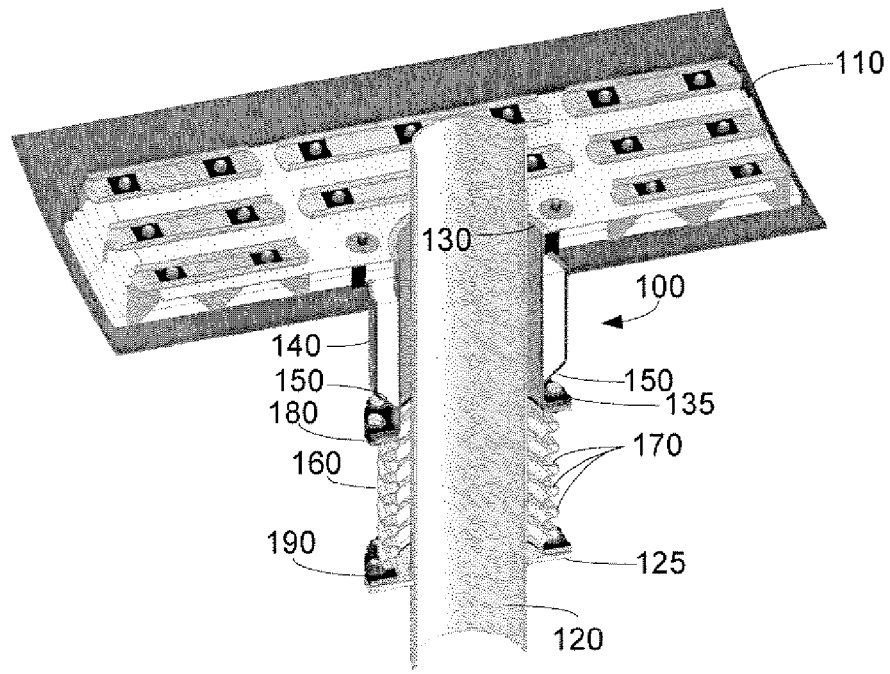
FIG. 2 is a side cross-sectional view of the pipe penetration system of FIG. 1.

Referring now to the drawings, in which like numerals refer to like elements throughout the several views, FIGS. 1 and 2 show a pipe penetration system 100 as is described herein. The pipe penetration system 100 is used with an insulated duct wall 110 of a conventional gas turbine engine. Likewise, the pipe penetration system 100 is used with a penetrating pipe 120. As described above, the penetrating pipe 120 may be used to supply steam for cooling, provide lubrication, remove exhaust, or any other desired purpose. The duct wall 110 may be made out of carbon steel, or similar types of high temperature resistant materials. Similarly, the penetrating pipe 120 is generally may be made out of stainless steel, Inconel (high strength austenitic nickel-chromium-iron alloys), or similar types of high temperature resistant materials. The penetrating pipe 120 may have a flange 125 welded thereon or the penetrating pipe 120 may be attached by other connection means.

The penetrating pipe 120 may be inserted through the duct wall 110 via a conventional pipe stub 130. The pipe stub 130 is generally slightly larger than the penetrating pipe 120 and protrudes from the duct wall 110. The pipe stub 130 may be made out of stainless steel, or similar types of high temperature resistant materials. The pipe stub 130 may include a pipe stub expansion joint flange 135 at the lower end thereof.

The pipe penetration system 100 may include a thermal sleeve 140 that surrounds the pipe stub 130 at the connection to the duct wall 110. The thermal sleeve 140 may have a slightly larger diameter than that of the pipe stub 130. The thermal sleeve 140 may end in a truncated conical closeout 150 about the penetrating pipe 130 so as to reduce thermal stress. The thermal sleeve 140 may be made out of carbon steel, or similar types of materials consistent with the material of the duct wall 110. The thermal sleeve 140 may be attached to the duct wall 110 via welding or similar types of connection means.

The pipe penetration system 100 further includes a metal bellows 160. The bellows 160 may be positioned beneath the thermal sleeve 140. The bellows 160 may include a number of curved folds 170 so as to expand and deflect as needed. The number of folds may be defined by the expected amount of lateral and axial displacement. The bellows 160 may be made out of carbon steel, stainless steel, Inconel (nickel-chromium-iron alloys), or similar types of materials with good ductile qualities. One end of the bellows 160 may be bolted to the pipe stud flange 135 via a first flange 180. The other end of the bellows may be bolted to the penetrating pipe flange 125 at a second flange 190. Other types of connection means may be used herein.

The use of the thermal sleeve 140 greatly reduces the temperature at the duct wall 110. Likewise, the use of the bellows 160 allows the penetrating pipe 120 to move in any direction. The pipe penetration system 100 as a whole thus allows for large displacements (axially, vertically, and radially) as well as accommodating thermally induced strains. Specifically, the pipe penetration system 100 accommodates high relative displacements between the duct wall 110 and the penetrating pipe 120. The pipe penetration system 100 addresses the potential high stresses at the duct wall 110 to the pipe 120 by thermally isolating the penetrating pipe 120 so as to lower the interface temperature. The pipe penetration system 100 thus accommodates large thermal movements while still being leak proof. The pipe penetrations system 100 allows for complete adjustment and requires no special installation tools or methods. The pipe penetration system 100 generally utilizes common and inexpensive manufacturing processes.

The pipe penetration system 100 may be used with the exhaust diffusers of for example, the 7H and the 9H model gas turbines sold by General Electric Company of Schenectady, N.Y. Specifically, the pipe penetration system 100 may be used in any application requiring high relative movement and low thermal stress.

Variations on the pipe penetration system 100 also can be used in other applications. For example, the pipe penetration system 100 could be used in a gas turbine inlet bleed heat system. In such a system, a large hot supply pipe 120 carrying high-pressure compressor air has to penetrate a duct wall 110. The pipe 120 should be thermally and mechanically decoupled from the duct 110. Many other applications may be used herein.

It should be readily apparent that the foregoing relates only to the preferred embodiments of the present application and that numerous changes and modifications may be made herein by one of ordinary skill in the art without departing from the general spirit and scope of the invention as defined by the following claims and the equivalents thereof.

We claim:

1. A penetration system, comprising:
    a pipe entering a duct wall at a pipe stub;
    a thermal sleeve surrounding the pipe stub;
    the thermal sleeve comprising a first end adjacent the duct wall and an opposite second end; and
    a bellows positioned about the opposite second end of the thermal sleeve and about the pipe.

2. The penetration system of claim 1, further comprising a pipe flange attached to the pipe.

3. The penetration system of claim 2, further comprising a pipe stub flange attached to the pipe stub.

4. The penetration system of claim 3, wherein the bellows comprises a first flange for connecting with the pipe stub flange and a second flange for connecting to the pipe flange.

5. The penetration system of claim 1, wherein the thermal sleeve is positioned into the duct wall.

6. The penetration system of claim 1, wherein the thermal sleeve comprises a truncated conical closeout.

7. The penetration system of claim 1, wherein the thermal sleeve comprises carbon steel.

8. The penetration system of claim 1, wherein the bellows comprises a plurality of folds.

9. The penetration system of claim 1, wherein the bellows comprises carbon steel, stainless steel, or nickel-chromium-iron alloys.

10. The penetration system of claim 1, wherein the bellows expands as the pipe deflects.

11. The penetration system of claim 1, wherein the bellows deflects laterally as the pipe deflects.

12. The penetration system of claim 1, wherein the bellows deflects vertically as the pipe deflects.

13. The penetration system of claim 1. wherein the bellows deflects radially as the pipe deflects.

14. A penetration system, comprising:
    pipe entering a duct wall at a pipe stub;
    a thermal sleeve surrounding the pipe stub and adjacent to the duct wall at a first end thereof; and
    a metal bellows positioned about an opposite second end of the thermal sleeve and about the pipe such that the metal bellows expands as the pipe expands.

15. The penetration system of claim 14, further comprising a pipe flange attached to the pipe.

16. The penetration system of claim 15, further comprising a pipe stub flange attached to the pipe stub.

17. The penetration system of claim 16, wherein the bellows comprises a first flange for connecting with the pipe stub flange and a second flange for connecting to the pipe flange.

18. The penetration system of claim 14, wherein the thermal sleeve comprises a truncated conical closeout.

19. The penetration system of claim 14, wherein the metal bellows deflects laterally, vertically and radially as the pipe deflects.

* * * * *